(12) United States Patent
Cronin

(10) Patent No.: US 8,438,715 B1
(45) Date of Patent: May 14, 2013

(54) METHODS OF INSTALLING A SNAP RING WITH RESPECT TO AN ANVIL OF AN IMPACT WRENCH

(76) Inventor: John Aloysius Cronin, Queen Creek, AZ (US)

( * ) Notice: Subject to any disclaimer, the term of this patent is extended or adjusted under 35 U.S.C. 154(b) by 244 days.

(21) Appl. No.: 13/092,936

(22) Filed: Apr. 23, 2011

Related U.S. Application Data

(60) Provisional application No. 61/343,161, filed on Apr. 23, 2010.

(51) Int. Cl.
*B23P 11/00* (2006.01)

(52) U.S. Cl.
USPC .................................. 29/451; 29/453; 29/222

(58) Field of Classification Search ..................... 29/450, 29/451, 453, 222
See application file for complete search history.

(56) References Cited

U.S. PATENT DOCUMENTS 4,606,246 A * 8/1986 Gunther ......................... 81/58.3

* cited by examiner

*Primary Examiner* — Jermie Cozart
(74) *Attorney, Agent, or Firm* — Parsons & Goltry; Michael W. Goltry; Robert A. Parsons

(57) ABSTRACT

A method of installing a snap ring, having opposed inner and outer diameters, onto an O-ring located in an annular groove of an anvil of an impact wrench includes providing a deformable base formed with an annular seat, seating the snap ring in into the annular seat, and applying the anvil of the impact wrench through the snap ring and into the deformable base applying the snap ring over the anvil and onto the O-ring located in the groove, wherein the anvil interacts with the snap ring in response to applying the anvil into and through the snap ring enlarging inner and outer diameters of the snap ring deforming the annular seat of the base allowing the snap ring to be received over the anvil and onto the O-ring located in the annular groove.

8 Claims, 9 Drawing Sheets

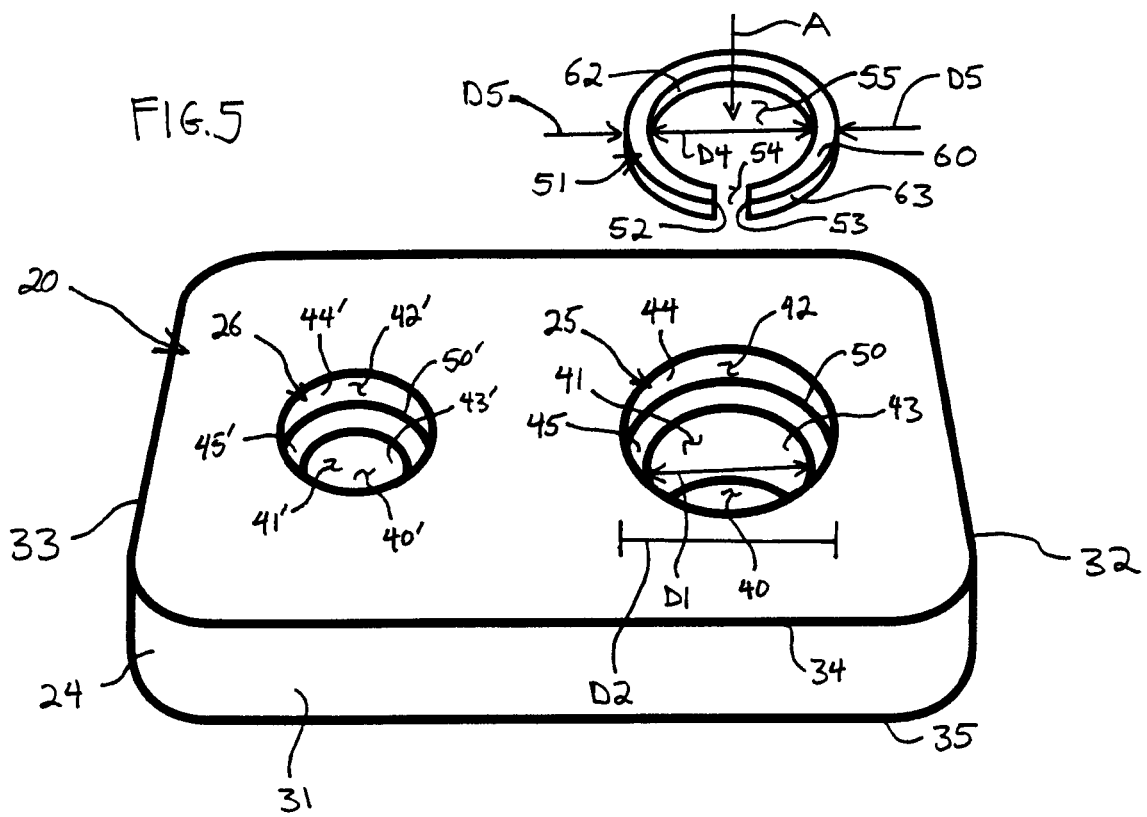

1

METHODS OF INSTALLING A SNAP RING WITH RESPECT TO AN ANVIL OF AN IMPACT WRENCH

FIELD OF THE INVENTION

The present invention relates to impact wrenches and, more particularly, to methods of installing snap rings with respect to anvils of impact wrenches.

BACKGROUND OF THE INVENTION

An impact wrench is a socket wrench power tool designed to deliver high torque output with minimal exertion by the user by storing energy in a rotating mass or hammer that is delivered suddenly to an output shaft or anvil. A socket is attached to the anvil, and the rotating hammer is accelerated by a motor and then suddenly connected to the anvil creating a high torque impact to the anvil and, in turn, to the socket attached to the anvil. The hammer mechanism is designed such that after delivering the impact the hammer is again allowed to spin freely. With this design, the only reaction force applied to the body of the tool is the motor accelerating the hammer, and thus the operator feels very little torque, even though a very high peak torque is delivered to the socket. Compressed air is the most common power source for impact wrenches, although electric and hydraulic power is also used, with cordless electric impact wrenches becoming more popular.

Various attachment systems are used to attach sockets to the anvils of impact wrenches. Common attachment systems include a spring-loaded pin incorporated in the anvil that snaps into a corresponding hole formed in the socket, or a snap ring which holds the socket by friction or by snapping into indents machined into the socket. A typical snap ring is a severed ring formed of rugged spring steel, which must be installed so as to encircle an O-ring located in an annular groove formed in the anvil. Installing a snap ring onto the O-ring located in the annular groove formed in the anvil of an impact wrench is notoriously difficult and time consuming due to the rugged and resilient characteristics of snap rings and limited locations at which to grasp or hold the snap ring. Accordingly, it would be highly desirable to provide a quick, efficient, inexpensive, and easy way to install a snap ring onto the O-ring located in the annular groove of an impact wrench.

SUMMARY OF THE INVENTION

According to the principle of the invention, there is a method of installing a snap ring onto an O-ring located in an annular groove of an anvil of an impact wrench. The snap ring is severed forming opposed snap ring ends each separated by a gap. The snap ring has an outer diameter, an opposed inner diameter bounding an anvil-receiving opening, and the snap ring is moveable between a closed position and an open position enlarging the outer and inner diameters of the snap ring and the gap between the snap ring ends to allow the snap ring to be received over the anvil and onto the O-ring located in the annular groove. The method of installing the snap ring relative to the anvil includes, according to the principle of the invention, providing a base formed with an annular seat that is deformable and that defines an inner diameter corresponding to or that otherwise relates to the outer diameter of the snap ring in the closed position of the snap ring. The method further includes seating the snap ring in the closed position thereof into the annular seat, the annular seat holding the snap ring such that the outer diameter of the snap ring is received in juxtaposition with respect to the inner diameter of the annular seat, with the anvil-receiving opening being presented so as to be available to receive the anvil therethrough. The method next includes applying the anvil into and through the opening of the snap ring applying the snap ring over the anvil and onto the O-ring located in the groove, the anvil interacting with the inner diameter of the snap ring in response to applying the anvil into and through the opening of the snap ring moving the snap ring from the closed position thereof to the open position thereof enlarging the inner and outer diameters of the snap ring and the gap between the snap ring ends of the snap ring deforming the annular seat and allowing the snap ring to be received over the anvil and onto the O-ring located in the annular groove. The step of deforming the annular seat specifically includes the annular seat expanding outwardly with respect to the anvil. The step of applying the anvil into and through the opening of the snap ring seated in the seat of the base and into the base applying the snap ring over the anvil and onto the O-ring located in the groove is carried out in approximately one second or less.

According to the principle of the invention, there is a method of installing a snap ring onto an O-ring located in an annular groove of an anvil of an impact wrench. The snap ring is severed forming opposed snap ring ends each separated by a gap. The snap ring has an outer diameter, an opposed inner diameter bounding an anvil-receiving opening, and the snap ring is moveable between a closed position and an open position enlarging the outer and inner diameters of the snap ring and the gap between the snap ring ends to allow the snap ring to be received over the anvil and onto the O-ring located in the annular groove. The method of installing the snap ring relative to the anvil includes, according to the principle of the invention, providing a bore and a corresponding counterbore formed in a deformable base to permit the counterbore and the bore to deflect or deform, the counterbore defining an inner diameter corresponding to the outer diameter of the snap ring in a closed position. The method further includes seating the snap ring in the closed position thereof into the counterbore, the counterbore holding the snap ring such that the outer diameter of the snap ring is received in juxtaposition with respect to the inner diameter of the counterbore, and the anvil-receiving opening is presented so as to be available to receive the anvil therethrough. The method still further includes applying the anvil into and through the opening of the snap ring into and through the counterbore and into the bore applying the snap ring over the anvil and onto the O-ring located in the groove, the anvil interacting with the inner diameter of the snap ring in response to applying the anvil into and through the opening of the snap ring and into and through the counterbore and into the bore moving the snap ring from the closed position thereof to the open position thereof enlarging the inner and outer diameters of the snap ring and the gap between the snap ring ends of the snap ring deforming the counterbore and the bore allowing the snap ring to be received over the anvil and onto the O-ring located in the annular groove. The step of deforming the counterbore and the bore specifically includes the counterbore and the bore expanding outwardly with respect to the anvil. The step of applying the anvil into and through the opening of the snap ring and into the base into and through the counterbore and into the bore applying the snap ring over the anvil and onto the O-ring located in the groove is carried out in approximately one second or less.

According to the principle of the invention, there is a method of installing a snap ring onto an O-ring located in an annular groove of an anvil of an impact wrench. The snap ring is severed forming opposed snap ring ends each separated by a gap. The snap ring has an outer diameter, an opposed inner diameter bounding an anvil-receiving opening, and the snap ring is moveable between a closed position and an open position enlarging the outer and inner diameters of the snap ring and the gap between the snap ring ends to allow the snap ring to be received over the anvil and onto the O-ring located in the annular groove. The method of installing the snap ring relative to the anvil includes, according to the principle of the invention, providing a bore and a corresponding counterbore formed in a deformable base to permit the bore and counterbore to be deformable, the counterbore defining a first inner diameter corresponding to the outer diameter of the snap ring in the closed position of the snap ring, and the bore defining a second inner diameter smaller than the first inner diameter of the counterbore. The method further includes seating the snap ring in the closed position thereof into the counterbore, the counterbore holding the snap ring such that the outer diameter of the snap ring is received in juxtaposition with respect to the first inner diameter of the counterbore, and the anvil-receiving opening is presented so as to be available to receive the anvil therethrough. The method still further includes applying the anvil into and through the opening of the snap ring into and through the counterbore and into the bore applying the snap ring over the anvil and onto the O-ring located in the groove, the anvil interacting with the inner diameter of the snap ring in response to applying the anvil into and through the opening of the snap ring and into and through the counterbore and into the bore moving the snap ring from the closed position thereof to the open position thereof enlarging the inner and outer diameters of the snap ring and the gap between the snap ring ends of the snap ring deforming the counterbore and the bore enlarging the first and second diameters of the counterbore and the bore, respectively, allowing the snap ring to be received over the anvil and onto the O-ring located in the annular groove. The step of applying the anvil into and through the opening of the snap ring into and through the counterbore and into the bore applying the snap ring over the anvil and onto the O-ring located in the groove is carried out in approximately one second or less.

BRIEF DESCRIPTION OF THE DRAWINGS

Referring to the drawings:

FIG. 5 is a perspective view of the snap ring of FIG. 4 positioned opposite to the base of FIG. 1 in preparation for installation into a snap ring receiving and holding structure of the base of FIG. 1;

DETAILED DESCRIPTION OF THE PREFERRED EMBODIMENT

Figure 1:
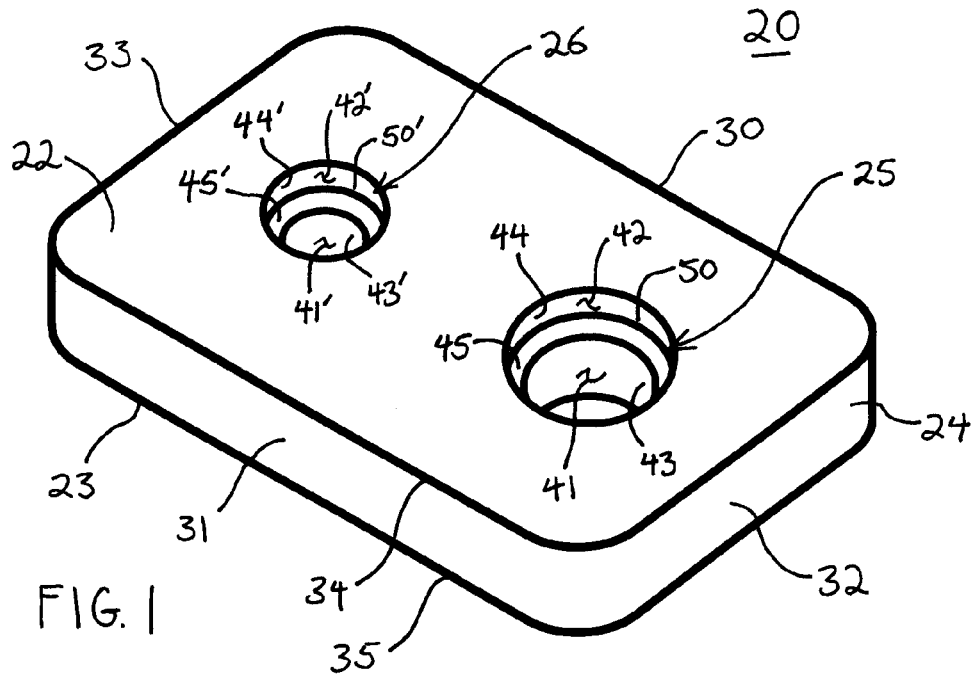
FIG. 1 is a perspective view of a base formed with snap ring receiving and holding structures for receiving and holding snap rings for use in installing snap rings with respect to anvils of impact wrenches, the base constructed and arranged in accordance with the principle of the invention.
Figure 2:
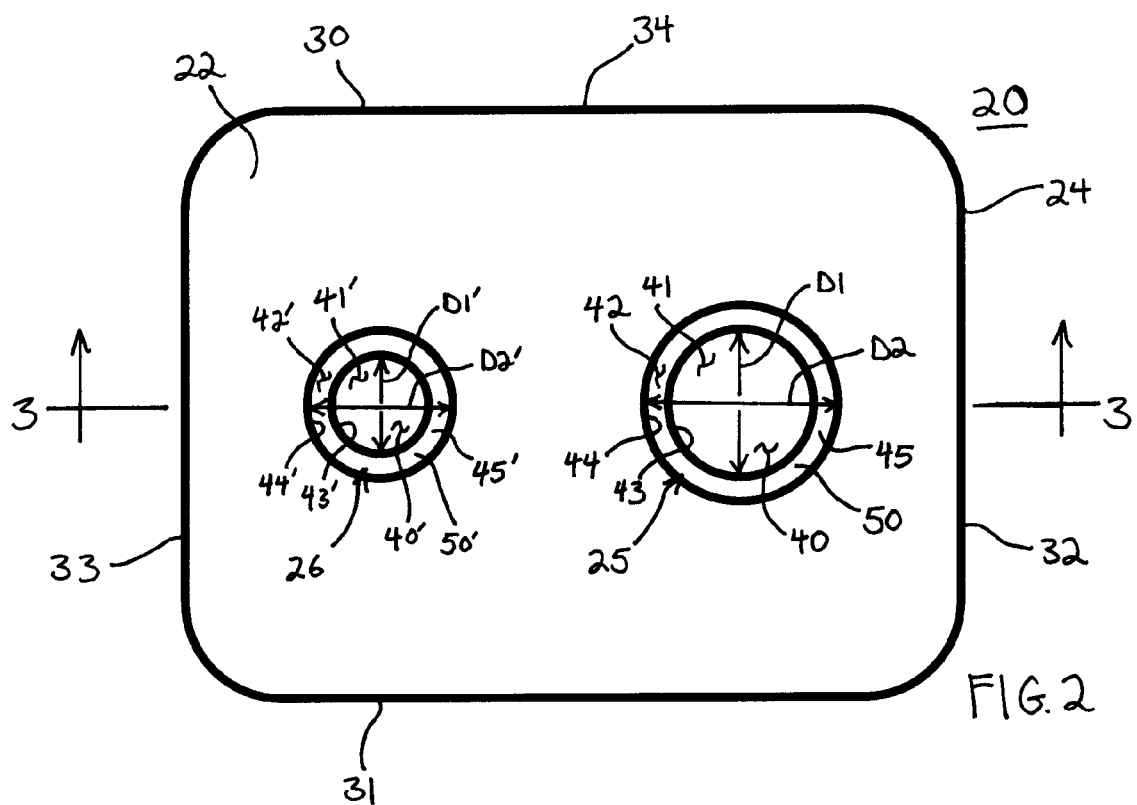
FIG. 2 is a top plan view of the base of FIG. 1.

Disclosed are methods of installing a snap ring relative to the anvil of an impact wrench and, more particularly, methods of installing a snap ring onto an O-ring located in an annular groove of an anvil of an impact wrench.

According to the principle of the invention, there is a method of installing a snap ring onto an O-ring located in an annular groove of an anvil of an impact wrench. The snap ring is severed forming opposed snap ring ends each separated by a gap. The snap ring has an outer diameter, an opposed inner diameter bounding an anvil-receiving opening, and the snap ring is moveable between a closed position and an open position enlarging the outer and inner diameters of the snap ring and the gap between the snap ring ends to allow the snap ring to be received over the anvil and onto the O-ring located in the annular groove. The method of installing the snap ring relative to the anvil includes, according to the principle of the invention, providing a base formed with an annular seat that is deformable and that defines an inner diameter corresponding to or that otherwise relates to the outer diameter of the snap ring in the closed position of the snap ring. The method further includes seating the snap ring in the closed position thereof into the annular seat, the annular seat holding the snap ring such that the outer diameter of the snap ring is received in juxtaposition with respect to the inner diameter of the annular seat, with the anvil-receiving opening being presented so as to be available to receive the anvil therethrough. The method next includes applying the anvil into and through the opening of the snap ring applying the snap ring over the anvil and onto the O-ring located in the groove, the anvil interacting with the inner diameter of the snap ring in response to applying the anvil into and through the opening of the snap ring moving the snap ring from the closed position thereof to the open position thereof enlarging the inner and outer diameters of the snap ring and the gap between the snap ring ends of the snap ring deforming the annular seat and allowing the snap ring to be received over the anvil and onto the O-ring located in the annular groove. The step of deforming the annular seat specifically includes the annular seat expanding outwardly with respect to the anvil. The step of applying the anvil into and through the opening of the snap ring seated in the seat of the base and into the base applying the snap ring over the anvil and onto the O-ring located in the groove is carried out in approximately one second or less.

According to the principle of the invention, there is another method of installing a snap ring onto an O-ring located in an annular groove of an anvil of an impact wrench. The snap ring is severed forming opposed snap ring ends each separated by a gap. The snap ring has an outer diameter, an opposed inner diameter bounding an anvil-receiving opening, and the snap ring is moveable between a closed position and an open position enlarging the outer and inner diameters of the snap ring and the gap between the snap ring ends to allow the snap ring to be received over the anvil and onto the O-ring located in the annular groove. The method of installing the snap ring relative to the anvil includes, according to the present embodiment, providing a bore and a corresponding counterbore formed in a deformable base to permit the counterbore and the bore to deflect or deform, the counterbore defining an inner diameter corresponding to the outer diameter of the snap ring in a closed position. The method further includes seating the snap ring in the closed position thereof into the counterbore, the counterbore holding the snap ring such that the outer diameter of the snap ring is received in juxtaposition with respect to the inner diameter of the counterbore, and the anvil-receiving opening is presented so as to be available to receive the anvil therethrough. The method still further includes applying the anvil into and through the opening of the snap ring into and through the counterbore and into the bore applying the snap ring over the anvil and onto the O-ring located in the groove, the anvil interacting with the inner diameter of the snap ring in response to applying the anvil into and through the opening of the snap ring and into and through the counterbore and into the bore moving the snap ring from the closed position thereof to the open position thereof enlarging the inner and outer diameters of the snap ring and the gap between the snap ring ends of the snap ring deforming the counterbore and the bore allowing the snap ring to be received over the anvil and onto the O-ring located in the annular groove. The step of deforming the counterbore and the bore specifically includes the counterbore and the bore expanding outwardly with respect to the anvil. The step of applying the anvil into and through the opening of the snap ring and into the base into and through the counterbore and into the bore applying the snap ring over the anvil and onto the O-ring located in the groove is carried out in approximately one second or less.

According to the principle of the invention, there is yet another method of installing a snap ring onto an O-ring located in an annular groove of an anvil of an impact wrench. The snap ring is severed forming opposed snap ring ends each separated by a gap. The snap ring has an outer diameter, an opposed inner diameter bounding an anvil-receiving opening, and the snap ring is moveable between a closed position and an open position enlarging the outer and inner diameters of the snap ring and the gap between the snap ring ends to allow the snap ring to be received over the anvil and onto the O-ring located in the annular groove. The method of installing the snap ring relative to the anvil in this embodiment includes, according to the principle of the invention, providing a bore and a corresponding counterbore formed in a deformable base to permit the bore and counterbore to be deformable, the counterbore defining a first inner diameter corresponding to the outer diameter of the snap ring in the closed position of the snap ring, and the bore defining a second inner diameter smaller than the first inner diameter of the counterbore. The method further includes seating the snap ring in the closed position thereof into the counterbore, the counterbore holding the snap ring such that the outer diameter of the snap ring is received in juxtaposition with respect to the first inner diameter of the counterbore, and the anvil-receiving opening is presented so as to be available to receive the anvil therethrough. The method still further includes applying the anvil into and through the opening of the snap ring into and through the counterbore and into the bore applying the snap ring over the anvil and onto the O-ring located in the groove, the anvil interacting with the inner diameter of the snap ring in response to applying the anvil into and through the opening of the snap ring and into and through the counterbore and into the bore moving the snap ring from the closed position thereof to the open position thereof enlarging the inner and outer diameters of the snap ring and the gap between the snap ring ends of the snap ring deforming the counterbore and the bore enlarging the first and second diameters of the counterbore and the bore, respectively, allowing the snap ring to be received over the anvil and onto the O-ring located in the annular groove. The step of applying the anvil into and through the opening of the snap ring into and through the counterbore and into the bore applying the snap ring over the anvil and onto the O-ring located in the groove is carried out in approximately one second or less.

Having generally set forth various method embodiments according to the principle of the invention, specific details thereof, including specific details of the base used in the various methods, will now be discussed in detail with reference to FIGS. 1-13.

Turning now to the drawings, in which like reference characters indicate corresponding elements throughout the several views, attention is first directed to FIG. 1 illustrating base 20 formed with snap-ring receiving and holding structures 25 and 26 for receiving and holding snap rings for use in installing snap rings with respect to anvils of impact wrenches. Base 20 consists of a body 21 having opposed top and bottom surfaces or faces 22 and 23, which extend outwardly from a geometric center and terminate outwardly at a continuous perimeter extremity or sidewall 24 that extends between top and bottom faces 22 and 23. Sidewall 24 is formed by opposed, parallel sides 30 and 31 that meet at opposed parallel ends 32 and 33 extending between sides 30 and 31.

Base 20 is a pad formed of a rubber or other like or similar elastomeric material or combination of elastomeric materials having the properties of flexibility, resiliency, deformability, and shape-memory. Base 20 is preferably an integral body formed by molding or machining. In shape, base 20 has a thin profile and is rectangular in the present embodiment. Base 20 has a thickness between opposed faces 22 and 23 which is preferably between approximately five to ten millimeters. Opposed faces 22 and 23 are flat and are coextensive and parallel with respect to each other and are transverse with respect to sidewall 24. Sidewall 24 and top face 22 meet at and form a top perimeter edge 34 encircling top face 22. Sidewall 24 and bottom face 23 meet at and form a bottom perimeter edge 35 which encircles bottom face 23. Sidewall 24 extends between top and bottom perimeter edges 34 and 35.

Snap-ring receiving and holding structure 25 opposes snap-ring receiving and holding structure 26. Snap-ring receiving and holding structure 25 is formed adjacent to end 32 of base 20 between sides 30 and 31 of base 20, and snap-ring receiving and holding structure 26 is formed adjacent to end 33 of base between sides 30 and 31 of base 20.

Figure 3:
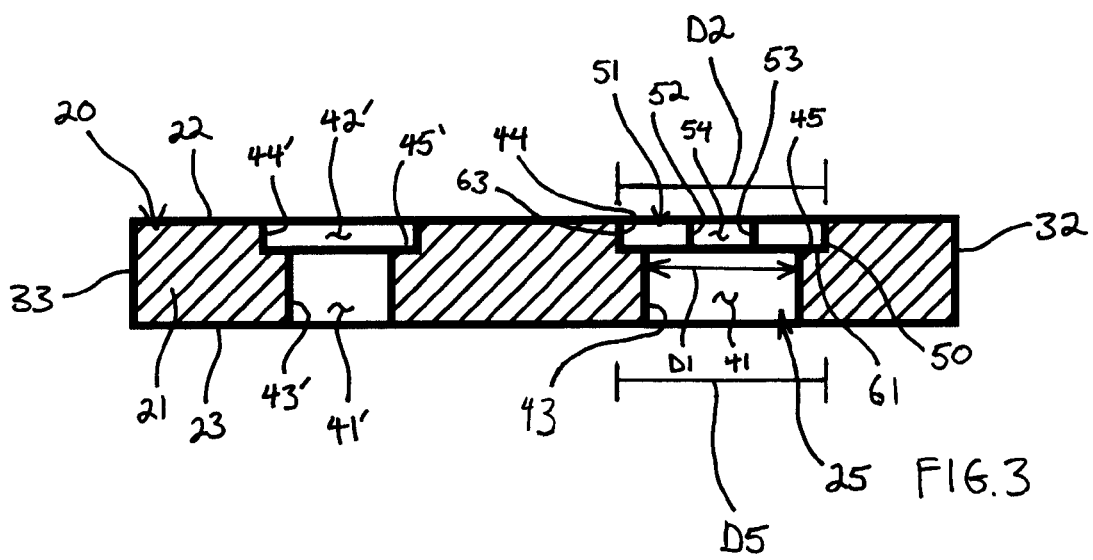
FIG. 3 is a section view taken along the line 3-3 of FIG. 2.

Snap-ring receiving and holding structure 25 is formed by an annular hole 40 extending through base 20 from top face 22 through body 21 to bottom face 23, as shown in FIG. 3. Hole 40 is formed by a bore 41 and a corresponding counterbore 42, which are formed between top and bottom faces 22 and 23 of base. Bore 41 and counterbore 42 are annular in shape and extend into body 21 of base 20 from and between top face 22 and bottom face 23 forming sidewalls 43 and 44, which are annular and inwardly directed. Sidewall 43 bounds bore 41 and has an inner diameter D1 which is less than an inner diameter D2 of sidewall 44 which bounds counterbore 42. Sidewalls 43 and 44 are parallel with respect to each other and to sidewall 24 and are transverse with respect to top and bottom faces 22 and 23. Counterbore 42 constitutes or otherwise forms a seat 50 in base 20, according to the principle of the invention, that is annular in shape and sized so as to receive an annular snap ring therein and forms in body 21 an annular lip 45 extending between sidewall 43 and 44. Lip 45 is parallel with respect to top and bottom faces 22 and 23 and is transverse with respect to sidewalls 43 and 44. Because seat 50 is annular, it may be referred to as an annular seat. Seat 50 and lip 45 are exposed relative to top face 22 such that seat 50 formed by counterbore 42 is available to receive a snap ring therein. Sidewalls 43 and 44 of bore 41 and counterbore 42 are integral to base 20, and as such, have the elastomeric properties of base, namely, flexibility, resiliency, deformability, and shape-memory, allowing sidewalls 43 and 44 to flex and deform outwardly and inwardly when under stress and allowing bore 41 and counterbore 42 to expand and constrict when under stress in response to the flexion and deformation of sidewalls 43 and 44, and to assume their original shape when free of a deforming stress characterizing the shape memory property. Inner diameters D1 and D2 of sidewalls 43 and 44, respectively, enlarge and contract in response to the flexion and deformation of sidewalls 43 and 44 when under an applied stress, and assume their original sizes when free of a deforming stress characterizing the shape memory property.

Snap-ring receiving and holding structure 26 is identical in every respect to snap-ring receiving and holding structure 25 but is different only in size so as to accommodate a differently-sized snap ring corresponding to a differently-sized anvil of an impact wrench. Common reference characters used to describe structure 26 are also used to denote the structural features of structure 26, and incorporate prime ("'") for clarity. In common with snap-ring receiving and holding structure 25, snap-ring receiving and holding structure 26 shares hole 40', bore 41' and corresponding counterbore 42', sidewalls 43' and 44' of bore 41' and counterbore 42', respectively, lip 45', and seat 50'. Sidewall 43' of bore 41' has an inner diameter D1' which is less than an inner diameter D2' of sidewall 44' of counterbore 42'. Inner diameter D1' of bore 41' is less than inner diameter D1 of bore 41, and inner diameter D2' of counterbore 42' is less than inner diameter D2 of counterbore 42, allowing a comparatively larger snap ring to be received and held in snap-ring receiving and holding structure 25 and a comparatively smaller snap ring to be received and held in snap-ring receiving and holding structure 26. Base 20 is formed with snap-ring receiving and holding structures 25 and 26, but in other embodiments base 20 is formed with one of one snap-ring receiving and holding structure or more than two snap-ring receiving and holding structures.

Figure 4:
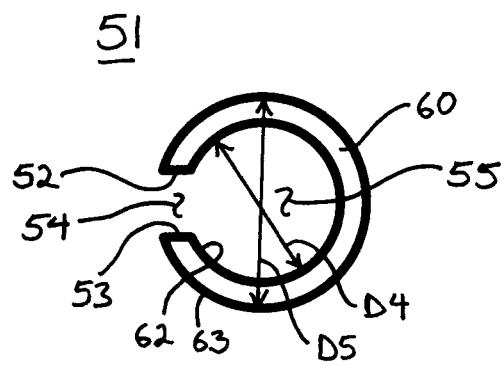
FIG. 4 is a top plan view of a prior art snap ring.

FIG. 4 illustrates a prior-art snap ring 51 severed forming opposed snap ring ends 52 and 53 separated by a gap 54. Snap ring 51 is made of metal and has the properties of resiliency, rigidity, flexibility, and shape-memory. Snap ring 51 includes opposed top and bottom surfaces 60 and 61 and opposed inner and outer sidewalls 62 and 63. Inner sidewall 62 defines an inner diameter D4 of snap ring 51 and outer sidewall 63 defines an outer diameter D5 of snap ring 51. Outer diameter D5 is greater than inner diameter D4. Inner diameter D4 of snap ring 51 defines an anvil-receiving opening 55, as will be explained below. Snap ring 51 is moveable between an at-rest, closed position, as shown in FIG. 5, and a stressed, open position. In the closed position, snap ring 51 is at rest, is not stressed, and maintains a gap 54 between opposed snap ring ends 52 and 53. In the open position of snap ring 51, snap ring 51 is under outward stress, biasing snap ring ends 52 and 53 outwardly and inner and outer diameters D4 and D5 are enlarged with respect to the closed position and gap 54 between snap ring ends 52 and 53 is enlarged with respect to the closed position. When under no deforming stress, the resilient and shape-memory properties of snap ring 51 cause snap ring 51 to assume its closed or at-rest position. Snap ring 51 is entirely conventional, further details of which will not be discussed as they will readily occur to the skilled artisan.

Figure 7:
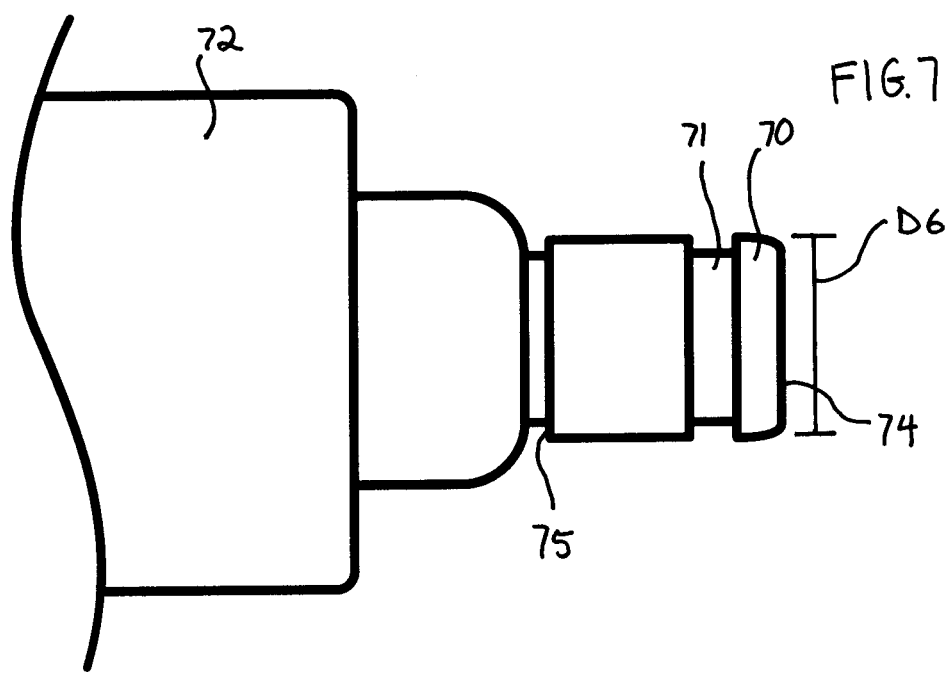
FIG. 7 is a side elevation view of an anvil of a prior art impact wrench.
Figure 8:
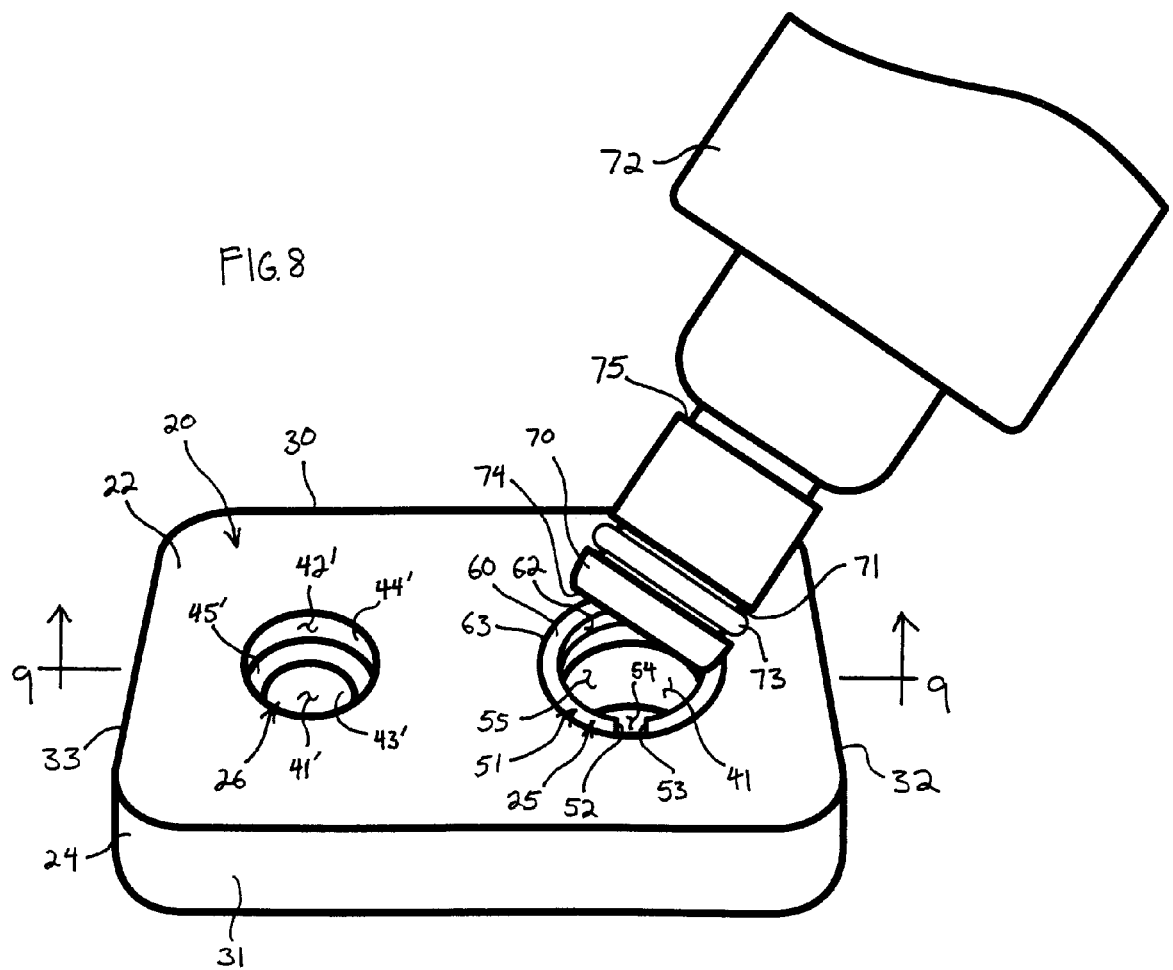
FIG. 8 is a perspective of the anvil of the impact wrench of FIG. 7 shown as it would appear formed with an installed O-ring and directed toward the snap ring seated in the snap ring receiving and holding structure first illustrated in FIG. 6 in a method of installing the snap ring onto the O-ring installed onto the anvil.

FIG. 7 shows a prior-art anvil 70 of an impact wrench formed with an annular snap ring groove 71. Anvil 70 is operatively coupled to the output shaft of an impact wrench 72 in a conventional and well-known manner. Anvil 70 includes opposed front and rear ends 74 and 75. Anvil 70 has a diameter D6. FIG. 8 shows an O-ring 73 located in and encircling snap ring groove 71 to receive snap ring 51. Anvil 70 and impact wrench 72 that anvil 70 is formed with are entirely conventional, further details of which will not be discussed as they will readily occur to the skilled artisan.

Base 20 is useful for installing snap ring 51 onto O-ring 73 located in snap ring groove 71 of anvil 70 of impact wrench 72, according to the principle of the invention. In one embodiment according to the principle of the invention, a method includes providing base 20 formed with seat 50 and seating snap ring 51 in the closed position thereof into seat 50 of base 20. FIG. 5 illustrates snap ring 51 positioned opposite base 20 in preparation for being installed with or otherwise set onto base 20 so as to seat snap ring 51 in the closed position thereof into seat 50. In the closed position of snap ring 51, outer sidewall 63 and outer diameter D5 of snap ring 51 correspond or otherwise relate to sidewall 44 and inner diameter D2 of counterbore 42, respectively. Top and bottom surfaces 60 and 61 of snap ring 51 are parallel with respect to top and bottom faces 22 and 23 of base 20 and to lip 45 of base 20. Outer sidewall 63 of snap ring 51 is parallel with respect to sidewall 44 of counterbore 42 of base 20.

Figure 6:
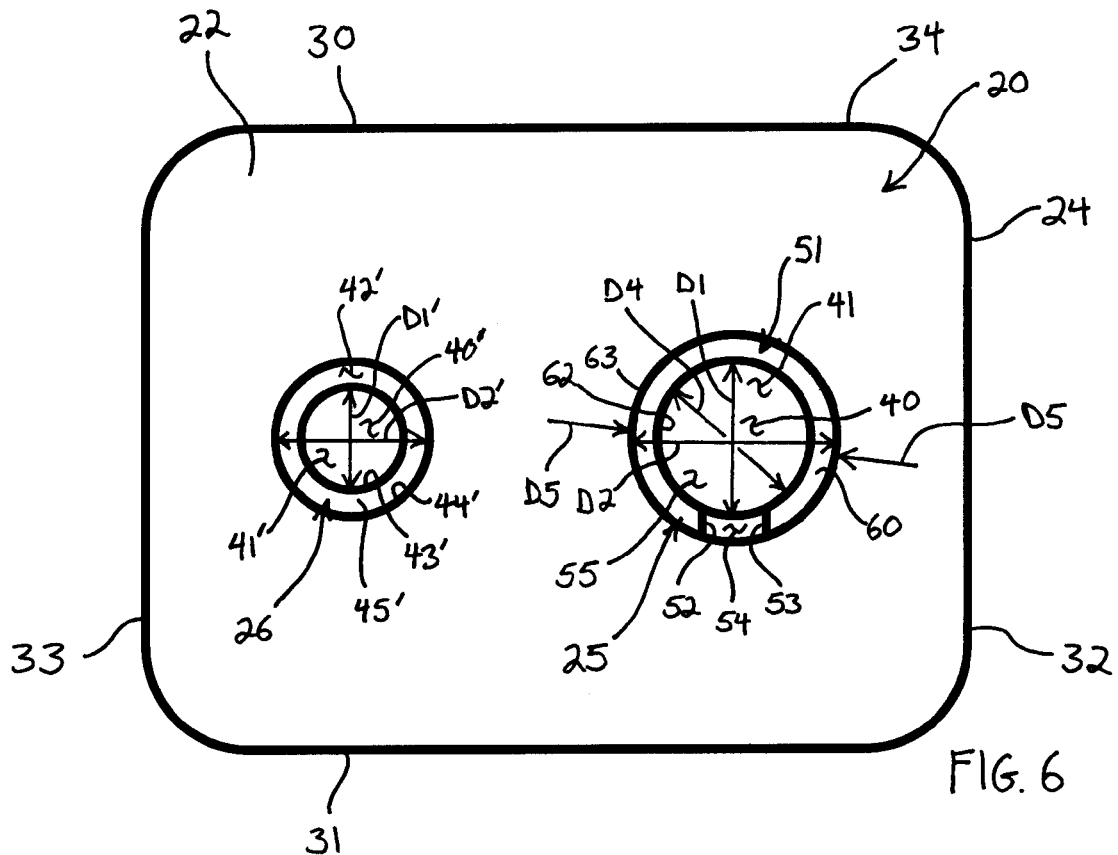
FIG. 6 is a top view of the snap ring of FIG. 4 shown as it would appear seated within a snap ring receiving and holding structure of the base of FIG. 1.

According to the principle of the invention, the method next includes the step of registering snap ring 51 with counterbore 42 and positioning snap ring 51 above top face 22 of base 20 so as to oppose counterbore 42. The method next includes advancing snap ring 51 downwardly toward counterbore 42 in the direction generally indicated by arrowed line A toward base 20 in FIG. 5 while maintaining the corresponding relationship of outer sidewall 63 of snap ring 51 with respect to sidewall 44 of counterbore 42 and applying snap ring 51 into counterbore 42 of hole 40 until bottom surface 61 of snap ring 51 encounters seat 50 formed by counterbore 42 preventing further movement of snap ring along arrowed line A and thus seating snap ring 51 in the closed position thereof within seat 50 formed by counterbore 42 of hole 40, as shown in FIG. 3 and FIG. 6. Because outer diameter D5 of snap ring 51 corresponds to inner diameter D2 of sidewall 44 of counterbore 42, when snap ring 51 is in the closed position outer sidewall 63 of snap ring 51 is received in juxtaposition with respect to sidewall 44 of counterbore 42 and bottom surface 61 of snap ring 51 is received in juxtaposition with respect to lip 45. And so the size and shape of seat 50 defined by counterbore 42 corresponds with the size and shape of snap ring 51 such that seat 50 snugly holds and maintains snap ring 51 in the closed position thereof such that outer diameter D5 of snap ring 51 is received in juxtaposition with respect to inner diameter D2 and opening 55 of snap ring is presented and exposed at counterbore 42 with respect to top face 22 of base 20 so as to be available to receive anvil 70 therethrough, as will now be explained.

Figure 9:
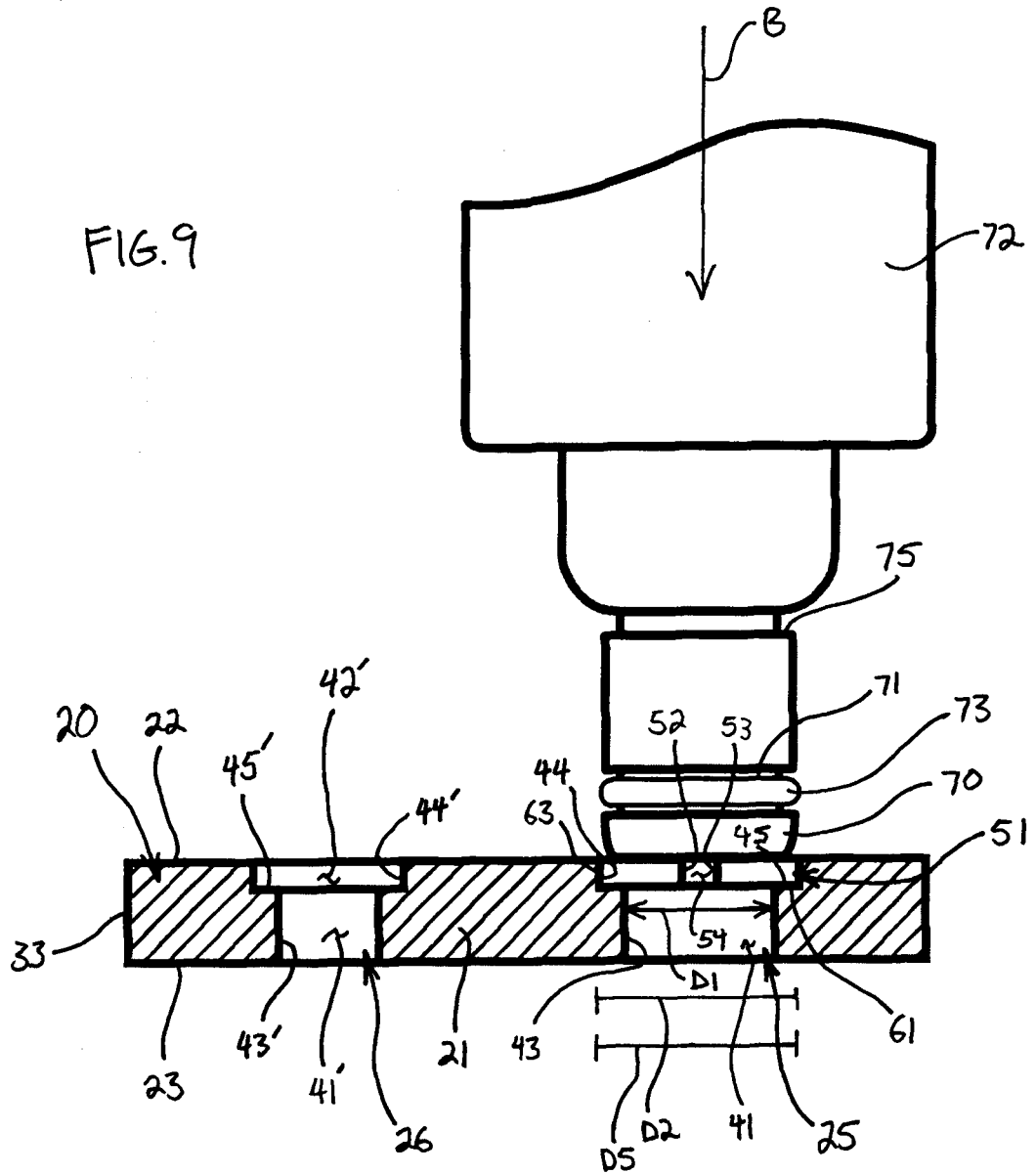
FIG. 9 is a vertical section view of the base taken along line 9-9 of FIG. 8 illustrating the snap ring, which is not sectioned, seated in the snap ring receiving and holding structure and the anvil of FIG. 8 directed against the snap ring in the method of installing the snap ring onto the O-ring installed onto the anvil.
Figure 10:
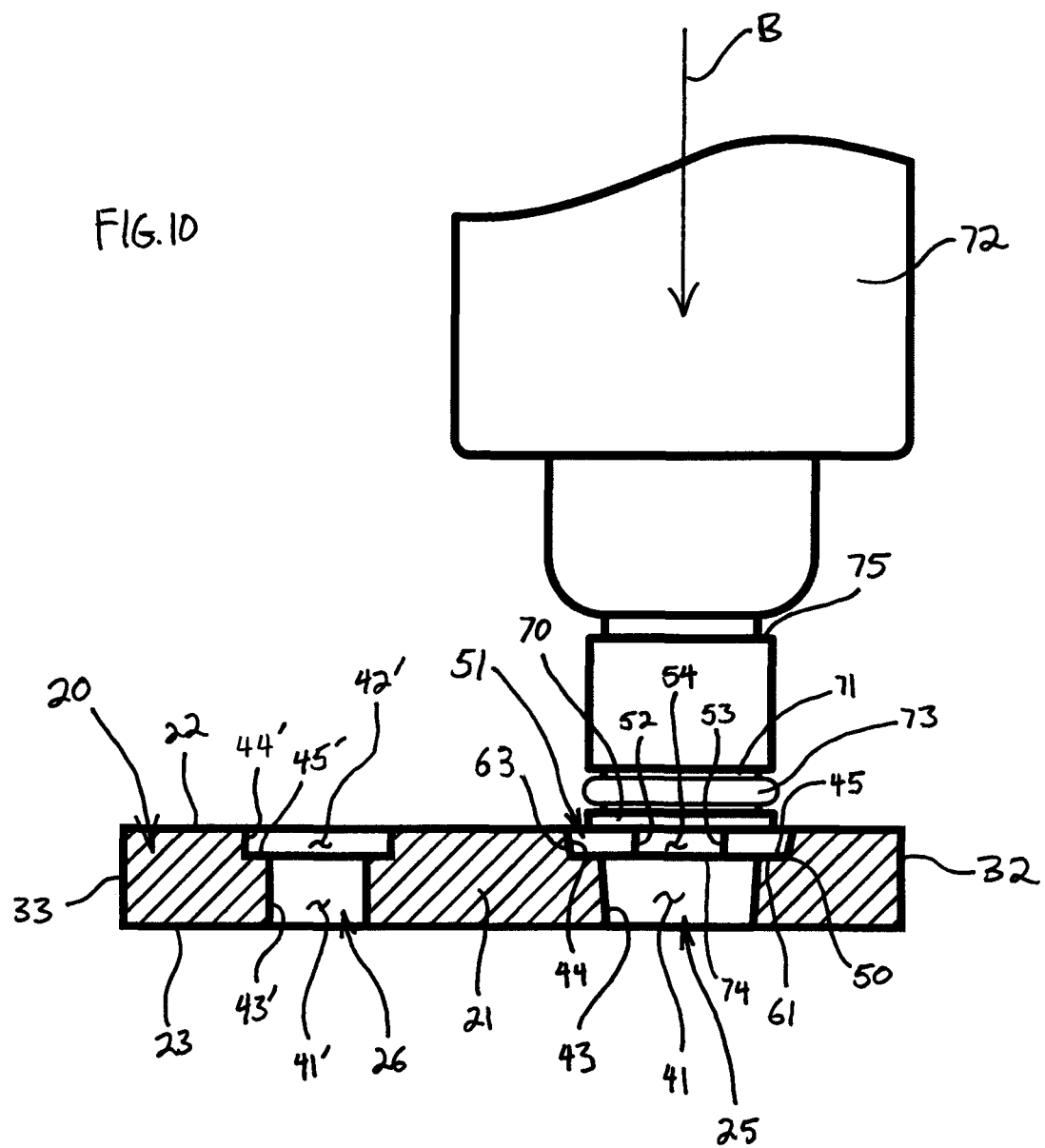
FIG. 10 is a view similar to that of FIG. 9 illustrating the anvil partially applied into the snap ring receiving and holding structure and the snap ring seated therein in the method of installing the snap ring onto the O-ring installed onto the anvil.
Figure 11:
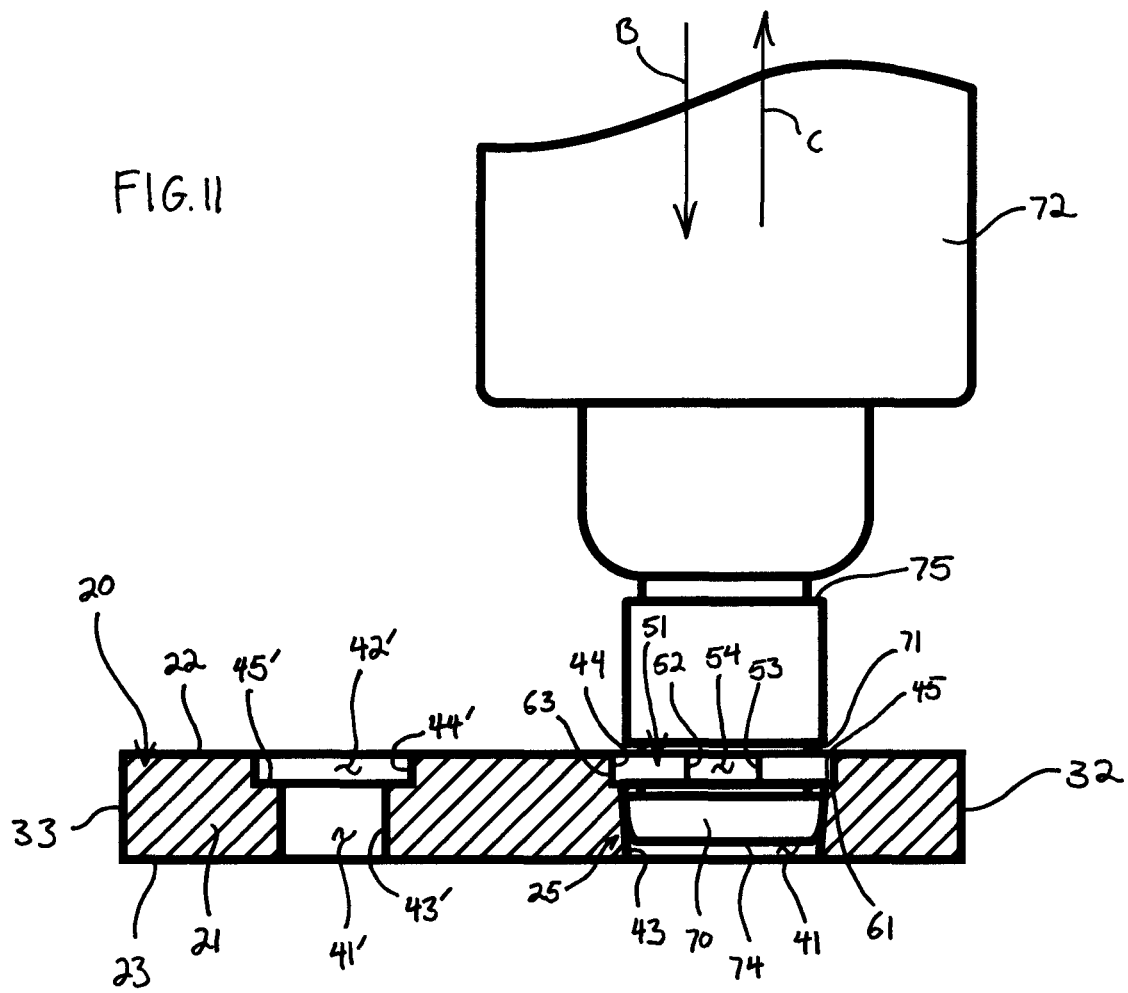
FIG. 11 is a view similar to that of FIG. 10 illustrating the anvil applied into the snap ring receiving and holding structure and through the snap ring to install the snap ring onto the O-ring installed onto the anvil in accordance with the method of installing the snap ring onto the O-ring installed onto the anvil.

FIG. 9 illustrates anvil 70 of impact wrench 72 positioned at top face 22 of base 20 registering anvil 70 with respect to hole 40, counterbore 42, seat 50, and opening 55 in snap ring 51. Front end 74 of anvil 70 is proximate to opening 55, and rear end 75 of anvil 70 is away from opening 55. To install snap ring 51 with respect to anvil 70 includes applying anvil 70 into and through opening 55 of snap ring 51 applying snap ring 51 over anvil 70 and onto O-ring 73 located in groove 71, wherein within these steps are sub-steps of anvil 70 interacting with inner diameter D4 of snap ring 51 in response to applying anvil 70 into and through opening 55 of snap ring 51 moving snap ring 51 from the closed position thereof to the open position thereof as shown in FIG. 10 enlarging inner and outer diameters D4 and D5 of snap ring 51 and gap 54 between snap ring ends 52 and 53 of snap ring 51 deforming annular seat 50 and allowing snap ring 51 to be received over anvil 70 and onto O-ring 73 located in groove 71 of anvil 70 as shown in FIG. 11. When snap ring 51 passes onto O-ring 73, it snaps from its open position to its closed position onto O-ring 73 so as to be snap received onto and over O-ring 73. Because snap ring 51 is installed over O-ring 73 located in groove 71 formed in anvil 70, snap ring 51 is installed with respect to anvil 70. More specific aspects of the method will now be discussed.

In FIG. 9 anvil 70 of impact wrench 72 positioned at top face 22 of base 20 registering anvil 70 with respect to hole 40, counterbore 42, seat 50, and opening 55 in snap ring 51. Front end 74 of anvil 70 is proximate to opening 55, and rear end 75 of anvil 70 is away from opening 55. From this point installing snap ring 51 relative to anvil 70 includes moving anvil 70 in one swift forcible stroke downwardly toward top face 22 of base 20 in the direction indicated by arrowed line B in FIG. 9 and applying anvil 70 into and through opening 55 of snap ring 51 moving front end 74 of anvil 70 into opening 55 of snap ring 51 and into and through counterbore 42 past top face 23 of base 20. Outer diameter D6 of anvil 70 is somewhat larger than inner diameter D4 of snap ring 51. As such, as anvil 70 is thrust downwardly in the direction generally indicated by arrowed line B through opening 55 in snap ring 51 the outer diameter D6 of anvil 70 encounters and interact with inner diameter D4 of inner sidewall 62 of snap ring 51 moving snap ring 51 from its at-rest, closed position in FIG. 9 to a stressed, open position in FIG. 10 in response to applying anvil 70 into and through opening 55 of snap ring 51. And so in response to thrusting anvil 70 into and through opening 55, inner and outer sidewalls 62 and 63 of snap ring 51 expand outwardly relative to anvil 70 as shown in FIGS. 10 and 11 into seat 50 enlarging inner and outer diameters D4 and D5 of snap ring 51 and moving snap ring ends 52 and 53 of snap ring 51 apart widening or otherwise enlarging gap 54 therebetween and outwardly deforming seat 50, which deformation of seat 50 allows allow snap ring 51 to deflect from its closed position to its open position to allow snap ring 51 to be received over anvil 70 and then onto O-ring 73 as shown in FIG. 11. Again, this process is carried out by forcing anvil 70 through opening 55 of snap ring 51 and into base 20 in one swift stroke, wherein the seat 50 holds snap ring 51 in place relative to the movement of the anvil 70 into and through opening 55 of snap ring 51 and into base 20 and which seat 50 deforms outwardly in response to the enlarging of snap ring 51 relative to anvil 70 as snap ring 51 passes over anvil 70 and onto O-ring 73. This swift, forcible stroke of thrusting anvil 70 through opening 55 of snap ring 51 and into base 20 to install snap ring 51 over and onto O-ring 73 to install snap ring 51 with respect to anvil 70 takes approximately one second or less thereby providing a very quick and efficient installation of O-ring 51 with respect to anvil 70 according to the principle of the invention. The term "approximately one second" means one second plus or minus margin of time of ½ second or less.

Figure 12:
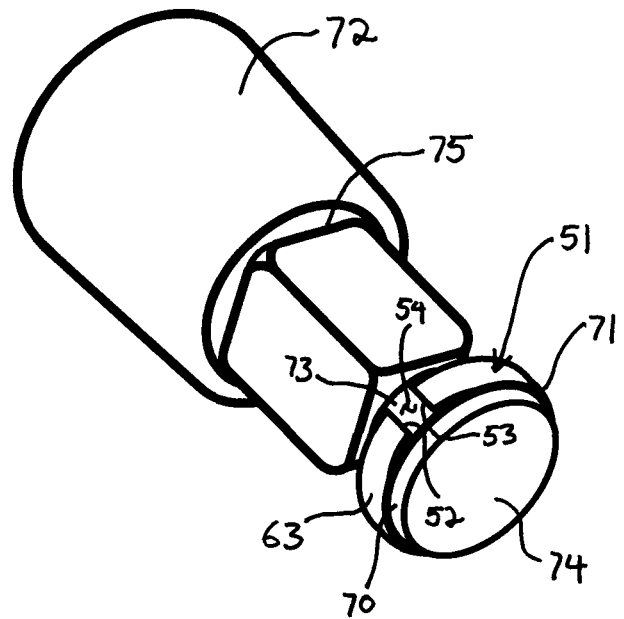
FIG. 12 is a perspective view of the anvil of FIG. 11 illustrating the snap ring installed onto the O-ring installed onto the anvil in accordance with the method of installing the snap ring onto the O-ring installed onto the anvil in accordance with the principle of the invention.
Figure 13:
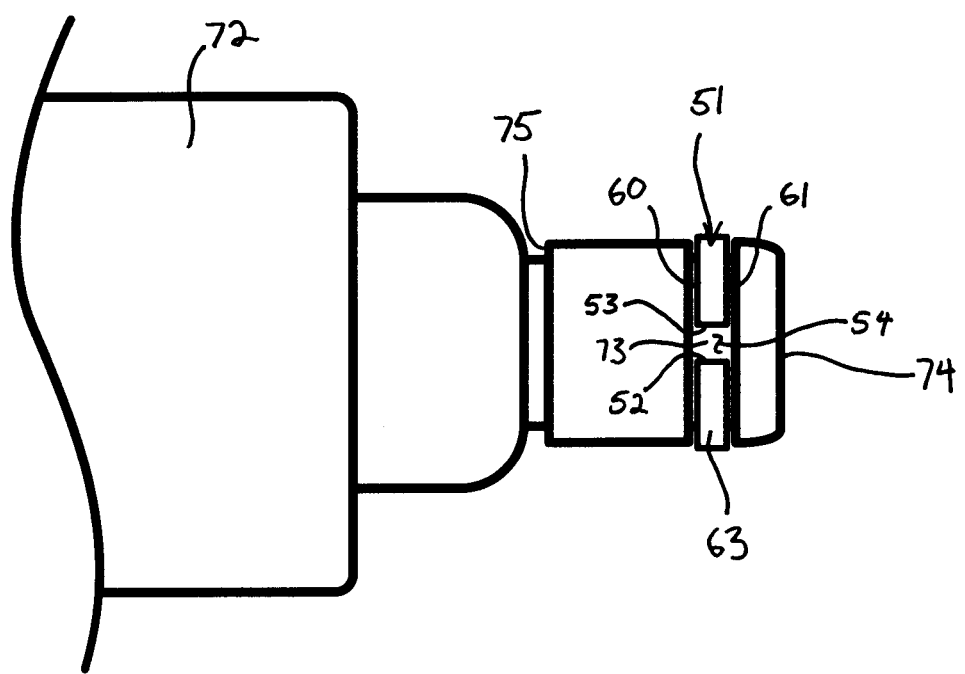
FIG. 13 is a side elevation view of the embodiment of FIG. 12.

At this point, anvil 70 with the installed snap ring 51 is moved away from base 20 and the anvil with the installed snap ring 51 installed according to the method of the invention are shown in FIGS. 12 and 13.

FIG. 10 illustrates snap ring 51 seated in seat 50 formed by counterbore 42 with snap ring 51 displaced outwardly relative to anvil 70 into its open position outwardly deforming seat 50 of counterbore 42, which holds snap ring 51 in place preventing snap ring 51 from displacing relative to seat 50 but allowing snap ring 51 to deform outwardly with respect to anvil 70. Inner and outer diameters D4 and D5 of snap ring 51 are enlarged and gap 54 between snap ring ends 52 and 53 is enlarged outwardly deforming seat 50 thereby enlarging inner diameter D2 of counterbore 42. The deformability base 20 allows the seat 50 formed by counterbore 42 of snap ring receiving and holding structure 25 to outwardly deflect in response to the outward deflection of snap ring 51 while concurrently holding snap ring 51 in place. In a more specific aspect, in response to snap ring 51 expanding outwardly with respect to anvil 70, outer sidewall 63 of snap ring 51 is forced against sidewall 44 of counterbore 42 outwardly deforming or expanding sidewall 44 outwardly with respect to anvil 70 outwardly deforming seat 50 and counterbore 42 with respect to anvil 70 and enlarging inner diameter D2 of counterbore 42.

The continued applying of anvil 70 through opening 55 of snap ring 51 along arrowed line B maintains snap ring 51 in the open position allowing snap ring 51 to be applied to and received over anvil 70 and onto O-ring 73 in snap ring groove 71. In this position, snap ring 51 is ready to be applied to O-ring 73. Bottom surface 61 of snap ring 51 encounters lip 45 of seat 50, preventing snap ring 51 from advancing together with anvil 70 in the direction indicated by arrowed line B toward bottom face 23 of base 20. Anvil 70 cooperates with seat 50 to hold snap ring 51 in the open position and in place with respect to base 20, anvil 70 continuing to interact with and deform snap ring 51 outwardly and seat 50 continuing to hold snap ring 51 in place, and allowing snap ring 51 to remain deformed in the open position. FIG. 10 illustrates snap ring 51 positioned and arranged in this manner, located between front end 74 of anvil 70 and O-ring 73, ready to be applied to O-ring 73 located in snap ring groove 71. Application of anvil 70 in the direction of arrowed line B now continues so as to apply snap ring 51 onto O-ring 73.

According to the principle of the invention, the method next includes continuing moving anvil 70 in the direction of arrowed line B of FIG. 10, moving front end 74 of anvil 70 through counterbore 42 and into bore 41, anvil 70 interacting in juxtaposition with respect to inner diameter D4 of inner sidewall 62 of snap ring 51 and moving snap ring 51 further into the open position. In response to the continued applying of anvil 70 into and through opening 55, inner and outer sidewalls 62 and 63 of snap ring 51 continue to expand outwardly, inner and outer diameters D4 and D5 of snap ring 51 continue to enlarge, and gap 54 of snap ring 51 continues to enlarge, deforming counterbore 42 and bore 41 allowing snap ring 51 to be received further over anvil 70 and onto O-ring 73 located in snap ring groove 71. Continued application of anvil 70 through opening 55 along arrowed line B in FIG. 11 advances front end 74 of anvil 70 toward bottom face 23 of base 20 through counterbore 42 and into bore 41, causing bore 41 with inner diameter D1 which is less than diameter D6 of anvil 70 to receive front end 74 of anvil 70, deforming bore 41 outwardly relative to anvil 70, and enlarging inner diameter D1 of bore 41. Lip 45 cooperates with continuing application of anvil 70 preventing advancement of snap ring 51 together with respect to anvil 70 moving snap ring 51 toward rear end 75 of anvil 70 onto O-ring 73 in response to applying anvil 70 into bore 41.

FIG. 11 illustrates anvil 70 fully applied to hole 40, into and through opening 55 of snap ring 51, into and through counterbore 42 and into bore 41, and snap ring 51 now seated on and received by and over O-ring 73. In this configuration, front end 74 of anvil 70 is proximate to bottom face 23 of base 20, is located in bore 41, and is received in juxtaposition by inner diameter D1 of sidewall 43 of bore 41. With sidewall 43 of bore 41 expanded outwardly by and in juxtaposition with anvil 70, bore 41 is deformed outwardly with respect to anvil 70. Snap ring 51 is located on and encircles O-ring 73. Snap ring 51 is maintained in seat 50 and returns to the closed position seated on O-ring 73.

Though presented and described as a series of sequential steps in FIGS. 9-11 and the accompanying description, it should be understood that the installation of snap ring 51 onto O-ring 73 using base 20 holding snap ring 51 is preferably accomplished in one single, continuous motion or stroke carried out in approximately one second or less as set forth above, such as by swiftly and smoothly depressing anvil 70 into snap ring receiving and holding structure 25 and snap ring 51 seated in snap ring receiving and holding structure 25 of base 20 until snap ring 51 is received onto and over O-ring 73. The operation of snap ring receiving and holding structure 26 is identical to that of snap ring receiving and holding structure 25, but with a smaller snap ring and a correspondingly smaller anvil of an impact wrench.

With snap ring 51 applied to and installed on O-ring 73 on anvil 70 as herein specifically described, anvil 70 can be removed from base 20 by taking up impact wrench 72 by hand and withdrawing it from base 20 in a direction indicated by arrowed line C in FIG. 11. In this manner, snap ring 51 is installed onto O-ring 73 located in snap ring groove 71 of anvil 70 of impact wrench 72, as shown in FIG. 12 and FIG. 13. FIG. 12 is a perspective view of anvil 70 of FIG. 11 illustrating snap ring 51 installed onto O-ring 73 in its closed position in accordance with the method of installing snap ring 51 onto O-ring 73 installed onto anvil 70 in accordance with the principle of the invention, and FIG. 13 is a side elevation view of the embodiment of FIG. 12.

With anvil 70 removed, the elastomeric and shape memory properties of base 20 cause base 20 to return to and assume its original shape in preparation for continued use, sidewall 43 of bore 41 returning to diameter D1 and sidewall 44 of counterbore 42 returning to diameter D2. In this way, base 20 can be used again and repeatedly to apply and install a snap ring onto an anvil of an impact wrench.

The invention has been described above with reference to preferred embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of installing a snap ring onto an O-ring located in an annular groove of an anvil of an impact wrench, the snap ring being severed forming opposed snap ring ends each separated by a gap, the snap ring having an outer diameter, an opposed inner diameter bounding an anvil-receiving opening, the snap ring moveable between a closed position and an open position enlarging the outer and inner diameters of the snap ring and the gap between the snap ring ends to allow the snap ring to be received over the anvil and onto the O-ring located in the annular groove, the method comprising the steps of:

providing a base formed with an annular seat, the annular seat being deformable and defining an inner diameter corresponding to the outer diameter of the snap ring in the closed position of the snap ring;

seating the snap ring in the closed position thereof into the annular seat, the annular seat holding the snap ring such that the outer diameter of the snap ring is received in juxtaposition with respect to the inner diameter of the annular seat, and the anvil-receiving opening is presented so as to be available to receive the anvil therethrough;

applying the anvil into and through the opening of the snap ring seated in the seat of the base and into the base applying the snap ring over the anvil and onto the O-ring located in the groove; and the anvil interacting with the inner diameter of the snap ring in response to applying the anvil into and through the opening of the snap ring moving the snap ring from the closed position thereof to the open position thereof enlarging the inner and outer diameters of the snap ring and the gap between the snap ring ends of the snap ring deforming the annular seat and allowing the snap ring to be received over the anvil and onto the O-ring located in the annular groove.

2. The method according to claim 1, wherein the step of deforming the annular seat further comprises the annular seat expanding outwardly with respect to the anvil.

3. The method according to claim 1, wherein the step of applying the anvil into and through the opening of the snap ring seated in the seat of the base and into the base applying the snap ring over the anvil and onto the O-ring located in the groove is carried out in approximately one second or less.

4. A method of installing a snap ring onto an O-ring located in an annular groove of an anvil of an impact wrench, the snap ring being severed forming opposed snap ring ends each separated by a gap, the snap ring having an outer diameter, an opposed inner diameter bounding an anvil-receiving opening, the snap ring moveable between a closed position and an open position enlarging the outer and inner diameters of the snap ring and the gap between the snap ring ends to allow the snap ring to be received over the anvil and onto the O-ring located in the annular groove, the method comprising the steps of:

providing a bore and a corresponding counterbore formed in a deformable base to permit the counterbore and the bore to deform, the counterbore defining an inner diameter corresponding to the outer diameter of the snap ring in a closed position;

seating the snap ring in the closed position thereof into the counterbore, the counterbore holding the snap ring such that the outer diameter of the snap ring is received in juxtaposition with respect to the inner diameter of the counterbore, and the anvil-receiving opening is presented so as to be available to receive the anvil therethrough;

applying the anvil into and through the opening of the snap ring and into the base into and through the counterbore and into the bore applying the snap ring over the anvil and onto the O-ring located in the groove; and the anvil interacting with the inner diameter of the snap ring in response to applying the anvil into and through the opening of the snap ring and into and through the counterbore and into the bore moving the snap ring from the closed position thereof to the open position thereof enlarging the inner and outer diameters of the snap ring and the gap between the snap ring ends of the snap ring deforming the counterbore and the bore allowing the snap ring to be received over the anvil and onto the O-ring located in the annular groove.

5. The method according to claim 4, wherein the step of deforming the counterbore and the bore further comprises the counterbore and the bore expanding outwardly with respect to the anvil.

6. The method according to claim 4, wherein the step of applying the anvil into and through the opening of the snap ring and into the base into and through the counterbore and into the bore applying the snap ring over the anvil and onto the O-ring located in the groove is carried out in approximately one second or less.

7. A method of installing a snap ring onto an O-ring located in an annular groove of an anvil of an impact wrench, the snap ring being severed forming opposed snap ring ends each separated by a gap, the snap ring having an outer diameter, an opposed inner diameter bounding an anvil-receiving opening, the snap ring moveable between a closed position and an open position enlarging the outer and inner diameters of the snap ring and the gap between the snap ring ends to allow the snap ring to be received over the anvil and onto the O-ring located in the annular groove, the method comprising the steps of:

providing a bore and a corresponding counterbore formed in a deformable base to permit the bore and counterbore to be deformable, the counterbore defining a first inner diameter corresponding to the outer diameter of the snap ring in the closed position of the snap ring, and the bore defining a second inner diameter smaller than the first inner diameter of the counterbore;

seating the snap ring in the closed position thereof into the counterbore, the counterbore holding the snap ring such that the outer diameter of the snap ring is received in juxtaposition with respect to the first inner diameter of the counterbore, and the anvil-receiving opening is presented so as to be available to receive the anvil therethrough;

applying the anvil into and through the opening of the snap ring into and through the counterbore and into the bore applying the snap ring over the anvil and onto the O-ring located in the groove; and the anvil interacting with the inner diameter of the snap ring in response to applying the anvil into and through the opening of the snap ring and into and through the counterbore and into the bore moving the snap ring from the closed position thereof to the open position thereof enlarging the inner and outer diameters of the snap ring and the gap between the snap ring ends of the snap ring deforming the counterbore and the bore enlarging the first and second diameters of the counterbore and the bore, respectively, allowing the snap ring to be received over the anvil and onto the O-ring located in the annular groove.

8. The method according to claim 7, wherein the step of applying the anvil into and through the opening of the snap ring into and through the counterbore and into the bore applying the snap ring over the anvil and onto the O-ring located in the groove is carried out in approximately one second or less.

\* \* \* \* \*